(12) United States Patent
Good et al.

(10) Patent No.: US 11,637,879 B2
(45) Date of Patent: Apr. 25, 2023

(54) HARDWARE ENCODER

(71) Applicant: WOWZA MEDIA SYSTEMS, LLC, Golden, CO (US)

(72) Inventors: Charles F. Good, Cincinnati, OH (US); Barry Owen, Littleton, CO (US); Ed Nelson Caggiani, Loveland, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 16/570,580

(22) Filed: Sep. 13, 2019

(65) Prior Publication Data
US 2020/0007950 A1 Jan. 2, 2020

Related U.S. Application Data

(62) Division of application No. 16/007,431, filed on Jun. 13, 2018, now Pat. No. 10,462,203.
(Continued)

(51) Int. Cl.
*H04L 65/60* (2022.01)
*H04N 21/6379* (2011.01)
(Continued)

(52) U.S. Cl.
CPC .......... *H04L 65/60* (2013.01); *H04L 41/0806* (2013.01); *H04L 51/52* (2022.05);
(Continued)

(58) Field of Classification Search
CPC ... H04L 65/607; H04L 65/60; H04L 65/4069; H04L 65/605
See application file for complete search history.

(56) References Cited

U.S. PATENT DOCUMENTS 5,816,076 A * 10/1998 Biedermann ....... E05B 73/0082
  70/57
6,039,574 A * 3/2000 Standiford ............. G09B 19/12
  273/237
(Continued)

OTHER PUBLICATIONS

Soderstrom, Thomas, "Cooler Master MasterBox 5 EATX Mid-Tower Case Review", Jul. 12, 2016, https://www.tomshardware.com/reviews/-cooler-master-masterbox-5-eatx-mid-tower-case,4672-2.html (Year: 2016).*

(Continued)

*Primary Examiner* — Ramy M Osman
(74) *Attorney, Agent, or Firm* — Porzio Bromberg & Newman P.C.

(57) ABSTRACT

A hardware encoder includes a chassis including at least one vent cut into a first surface of the chassis. The hardware encoder further includes an input interface disposed within the chassis and configured to receive a media signal. The hardware encoder further includes encoding circuitry disposed within the chassis and configured to encode the media signal to generate a media stream. The hardware encoder further includes a network interface disposed within the chassis and configured to send the media stream to a publishing destination. The hardware encoder further includes a bezel attached to the first surface of the chassis and enabling a view of a display screen. A portion of the bezel extrudes in a direction away from the first surface to enable airflow into the at least one vent.

18 Claims, 12 Drawing Sheets

Related U.S. Application Data

(60) Provisional application No. 62/518,981, filed on Jun. 13, 2017.

(51) Int. Cl.

| | | |
|---|---|---|
| *H04N 21/4363* | (2011.01) | |
| *H04N 21/2343* | (2011.01) | |
| *H04N 21/2743* | (2011.01) | |
| *H04N 21/266* | (2011.01) | |
| *H04N 21/254* | (2011.01) | |
| *H04L 41/0806* | (2022.01) | |
| *H04N 1/00* | (2006.01) | |
| *H04L 51/52* | (2022.01) | |
| *H04L 65/61* | (2022.01) | |
| *H04L 65/70* | (2022.01) | |
| *H04L 65/75* | (2022.01) | |
| *H04L 67/562* | (2022.01) | |
| *H04W 4/50* | (2018.01) | |

(52) U.S. Cl.
CPC .............. *H04L 65/61* (2022.05); *H04L 65/70* (2022.05); *H04L 65/765* (2022.05); *H04L 67/562* (2022.05); *H04N 1/00519* (2013.01); *H04N 1/00551* (2013.01); *H04N 21/2343* (2013.01); *H04N 21/254* (2013.01); *H04N 21/266* (2013.01); *H04N 21/2743* (2013.01); *H04N 21/43637* (2013.01); *H04N 21/6379* (2013.01); *H04W 4/50* (2018.02)

(56) References Cited

U.S. PATENT DOCUMENTS

| | | | |
|---|---|---|---|
| D422,993 S * | 4/2000 | Storti | D14/432 |
| 8,009,426 B2 * | 8/2011 | Ahmad-Taylor | H05K 7/20127 361/692 |
| 8,341,678 B1 | 12/2012 | Du Val | |
| 8,401,869 B2 | 3/2013 | Renzi et al. | |
| 8,667,075 B1 | 3/2014 | King et al. | |
| 9,106,887 B1 | 8/2015 | Owen | |
| D740,293 S * | 10/2015 | Kuehn | D14/444 |
| 9,179,159 B2 * | 11/2015 | Good | H04N 21/2662 |
| D776,078 S * | 1/2017 | Williamson | D14/188 |
| 10,462,203 B2 * | 10/2019 | Good | H04L 65/61 |
| 10,554,706 B1 * | 2/2020 | Good | H04L 67/02 |
| 10,602,310 B2 * | 3/2020 | Owen | H04L 65/403 |
| D944,805 S * | 3/2022 | Feng | D14/441 |
| 2004/0174934 A1 | 9/2004 | Komi et al. | |
| 2007/0053379 A1 * | 3/2007 | Hershey | H04N 17/004 370/466 |
| 2007/0070404 A1 * | 3/2007 | Caradec | H04N 21/4402 358/1.15 |
| 2007/0180062 A1 | 8/2007 | Southerland et al. | |
| 2007/0180166 A1 | 8/2007 | Southerland et al. | |
| 2009/0097201 A1 * | 4/2009 | Ahmad-Taylor | H05K 7/20127 361/692 |
| 2009/0119379 A1 | 5/2009 | Read et al. | |
| 2009/0323802 A1 | 12/2009 | Walters et al. | |
| 2010/0074738 A1 * | 3/2010 | Yoshizaki | F04D 25/084 415/182.1 |
| 2011/0060998 A1 * | 3/2011 | Schwartz | G06F 16/954 715/738 |
| 2012/0124634 A1 * | 5/2012 | Yamaguchi | H04N 21/21825 725/115 |
| 2013/0186603 A1 * | 7/2013 | Chou | G06F 1/203 165/122 |
| 2013/0343450 A1 * | 12/2013 | Solka | H04N 19/40 375/240.03 |
| 2014/0067828 A1 | 3/2014 | Archibong et al. | |
| 2014/0376623 A1 * | 12/2014 | Good | H04N 19/40 375/240.07 |
| 2015/0312572 A1 * | 10/2015 | Owen | H04L 65/607 375/240.02 |
| 2015/0350290 A1 | 12/2015 | Yang et al. | |
| 2016/0277709 A1 | 9/2016 | Stringham et al. | |
| 2017/0006315 A1 | 1/2017 | Giladi | |
| 2017/0078686 A1 * | 3/2017 | Coward | H04N 19/90 |
| 2017/0235357 A1 | 8/2017 | Leung | |
| 2018/0159752 A1 * | 6/2018 | Fratini | H04L 43/0811 |
| 2018/0302455 A1 | 10/2018 | Bordoloi | |
| 2018/0338143 A1 * | 11/2018 | Fracastoro | H04N 19/139 |
| 2018/0359538 A1 | 12/2018 | Good et al. | |
| 2019/0251381 A1 * | 8/2019 | Roderick | G06K 9/00892 |
| 2020/0007950 A1 * | 1/2020 | Good | H04N 21/254 |
| 2020/0145700 A1 * | 5/2020 | Meyer | H04N 21/21805 |

OTHER PUBLICATIONS

Motorola, "MDV580T Users manual", Sep. 12, 2007, https://fccid.io/U4J-MDV850T/User-Manual/Manual-841868 (Year: 2007).*

Soderstrom, Thomas, "Cooler Master MasterBox 5 EATX Mid-Tower Case Review: Part 1: External & Internal Features", Jul. 12, 2016, https://www.tomshardware.com/reviews/-cooler-master-masterbox-5-eatx-mid-tower-case,4672.html (Year: 2016).*

Soderstrom, Thomas "Cooler Master MasterBox 5 EATX Mid-Tower Case Review: Part 2: Test Results & Conclusion", Jul. 12, 2016, https://www.tomshardware.com/reviews/-cooler-master-masterbox-5-eatx-mid-tower-case,4672-2.html (Year: 2016).*

MMO Champion, "adding in case fans: Blow air into the case or suck air out?", Jan. 15, 2011, access: https://www.mmo-champion.com/threads/831741-adding-in-case-fans-Blow-air-into-the-case-or-suck-air-out (Year: 2011).*

Mathis, Daven, "Wowza ClearCaster review", Dec. 5, 2017, https://www.digitaltrends.com/photography/wowza-clearcaster-review/ (Year: 2017).*

* cited by examiner

[field(1), ... field(n)] {"key(1)":"value(1)", ... "key(n)":"value(n)"} ⎯ 310

[1,command-request,encoder,client,client-12345678-1234-1234-1234-12345678, "prepareStream"]{"messageType":"command-request", "destination":"encoder", "source":"client", messageId="client-123e4567-e89b-12d3-a456-426655440000", subject="prepareStream", "application":"HWEncode", "socialAPIId"=1234}

[1,command-response,client,encoder,encoder-87654321-4321-4321-4321-8765432 1,client-12345678-1234-1234-1234-12345678]{"messageType":"command-response ", "destination":"client", "source"="encoder", messageId="encoder-87654321-4321-4321-4321-87654321", subject="client-12345678-1234-1234-1234-12345678", "status":200, "description"="OK"} ⎯ 320

[1,status,encoder,encoder-98765432-4321-4321-4321-87654321,currentState]{ "messageType":"status", "encoder"="encoder", messageId="encoder-98765432-4321-4321-4321-87654321", subject="currentState", "state":"countDown", "countDownValue"=2} ⎯ 330

*FIG. 3*

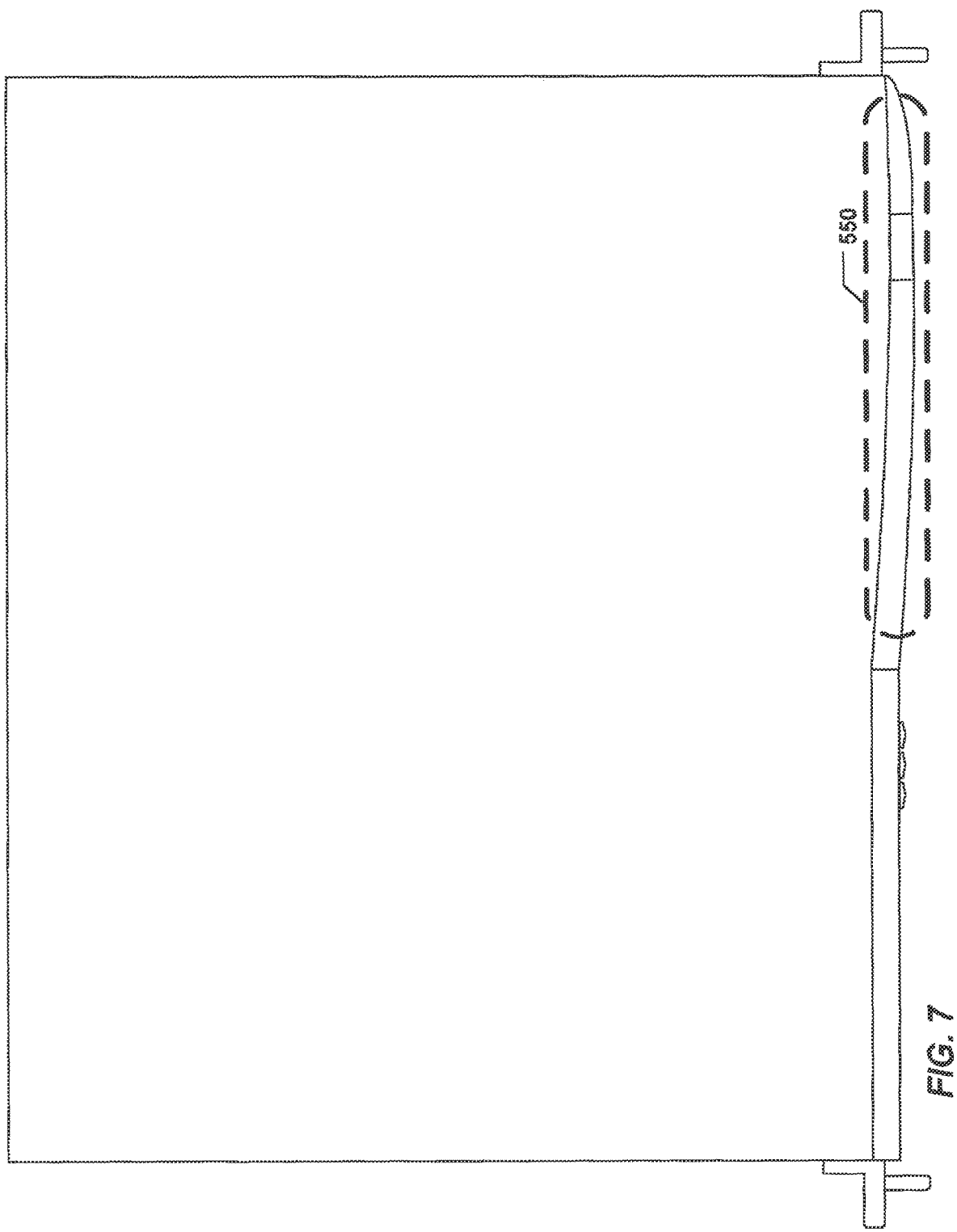

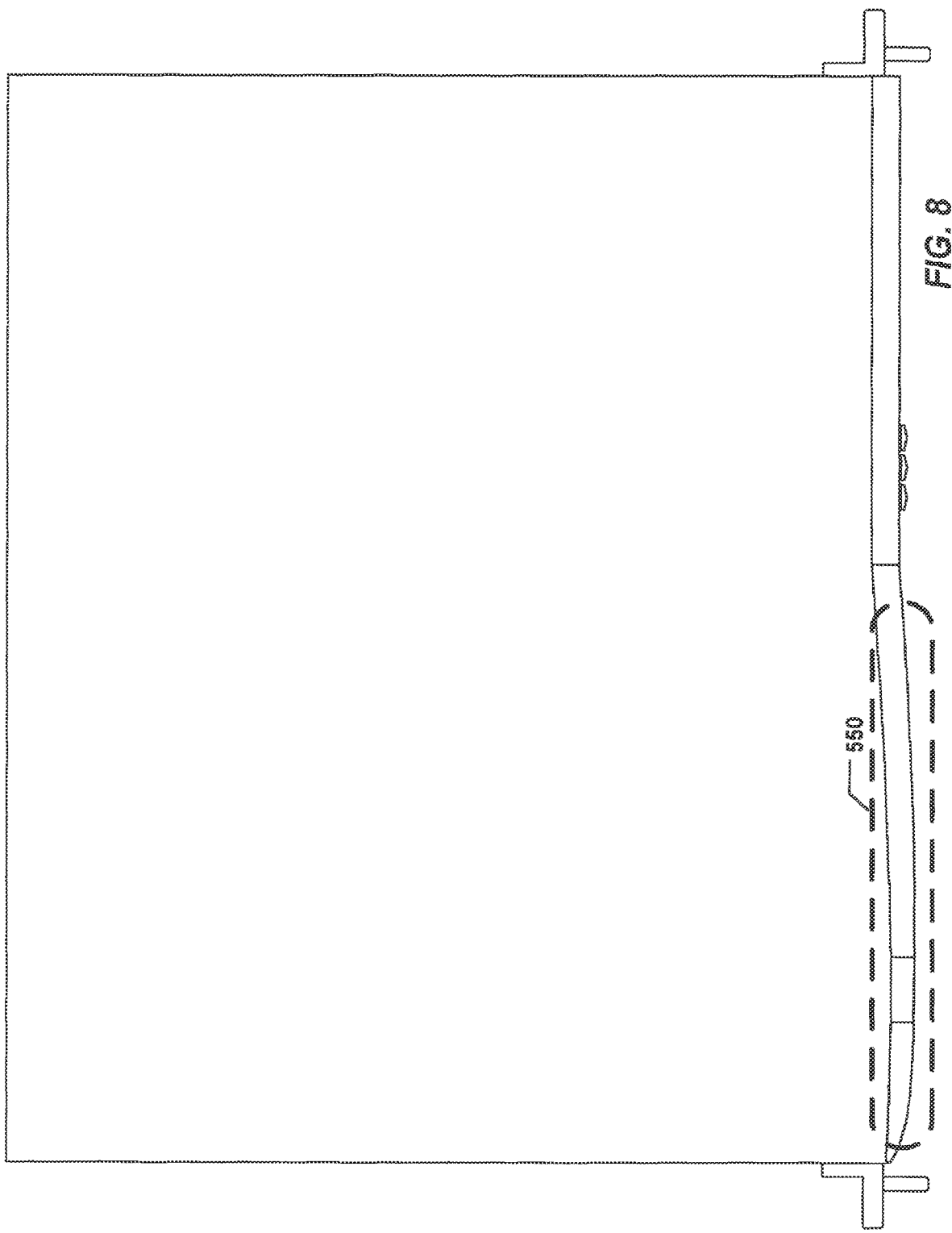

HARDWARE ENCODER

CROSS-REFERENCE TO RELATED APPLICATIONS

The present application claims priority to and the benefit of U.S. patent application Ser. No. 16/007,431 filed on Jun. 13, 2018, which claims benefit of U.S. Provisional Patent Application No. 62/518,981 filed on Jun. 13, 2017, the content of each of which is incorporated by reference herein in its entirety.

BACKGROUND

The popularity of the Internet, coupled with the increasing capabilities of mobile electronic devices, has provided consumers with the ability to enjoy multimedia content on the go. For example, live content (e.g., sports events) and video on demand (VOD) content (e.g., television shows and movies) can be streamed via the Internet to electronic devices (e.g., computers, mobile phones, or Internet-enabled televisions). To playback media streams, electronic devices typically execute a media player software application.

Mobile devices vary greatly in terms of hardware, software/operating system, wireless network compatibility, and media format compatibility. Moreover, different media delivery mechanisms (e.g., protocols, networks, etc.) may have different recommended media encoding settings for reliable delivery to destination devices. Consequently, media encoding for Internet content delivery has become a complex undertaking.

BRIEF DESCRIPTION OF DRAWINGS

FIG. 3 is a diagram depicting examples of messaging associated with the hardware encoder of FIG. 1;

FIGS. 5, 6, 7, 8, 9, and 10 are a perspective view, front view, top view, bottom view, left side view and right side view, respectively, of an example of the hardware encoder of FIG. 1;

DETAILED DESCRIPTION

Figure 1:
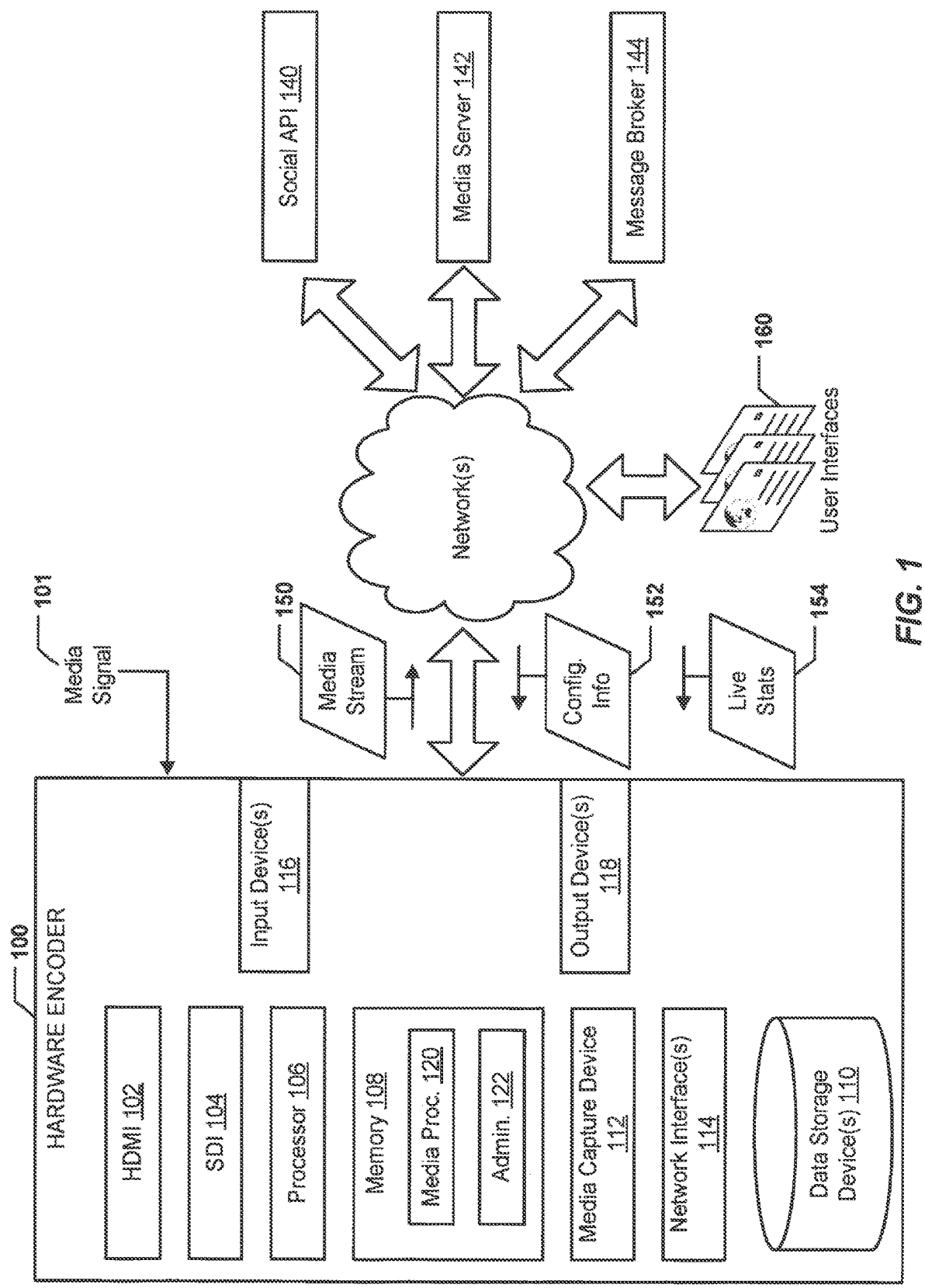
FIG. 1 is a diagram of an example of a system that includes a hardware encoder.

Media encoders can be classified into hardware encoders and software encoders. Hardware encoders typically include special purpose electrical circuitry/components that are selected to perform a subset of tasks, such as executing encoding algorithms, efficiently. Software encoders typically include software modules that are capable of executing encoding algorithms on general-purpose computing hardware, and may therefore be used on a wide variety of hardware platforms (e.g., personal computers, on-premises servers, cloud servers, etc.). For a given encoding workflow, a hardware encoder can be expected to provide lower latency and/or higher quality than a software encoder, but at the expense of workflow flexibility, because hardware is more difficult to reprogram/reconfigure than software. The present disclosure describes a hardware encoder and methods of operation at the hardware encoder, including dynamic reconfiguration capability at the hardware encoder. Advantageously, the described hardware encoder may provide high quality media streams at lower bitrates than other hardware/software encoders (e.g., the hardware encoder may provide good "quality per bit").

In a particular aspect, the hardware encoder can be configured by a mobile device (e.g., executing a suitably programmed mobile application) that is on the same private network as the hardware encoder. For example, the mobile device and the hardware encoder may both be on the same local area Wi-Fi network or may communicate via a Bluetooth network/connection.

In a particular aspect, the hardware encoder receives configuration information originating from a third-party mobile application. For example, the hardware encoder is configured to send a media stream to a publishing destination (e.g., associated with a social network) and to receive configuration information from a mobile app associated with the social network.

In a particular aspect, configuration information received by the hardware encoder may be based on one or more of an input signal (e.g. that is currently being encoded by the hardware encoder), a publishing destination that the hardware encoder sends an encoded stream to, viewership information associated with the encoded stream, or network information associated with the publishing destination.

In a particular aspect, the hardware encoder is part of a system that also includes a broker configured to forward received configuration information to the hardware encoder via a message queue telemetry transport (MQTT) protocol. Use of the MQTT protocol may enable certain details regarding the hardware encoder to be hidden. For example, a remote configurator may send the hardware encoder configuration information without needing to know a specific universally unique identifier (UUID) of the hardware encoder, and may instead use some other identifier to refer to the hardware encoder or a user associated therewith.

In a particular aspect, the hardware encoder is configured to receive and display statistics (e.g., "live" statistics) regarding a media stream output by the hardware encoder. Alternatively, or in addition, the hardware encoder may adjust encoding of the media stream based on the statistics.

In a particular aspect, the hardware encoder has an outer chassis that includes vent hole(s) on a surface and a bezel attached to the surface, the bezel enabling view of a display screen. A portion of the bezel extrudes away from the surface to enable airflow into the vent hole(s). The portion of the bezel may also, in some examples, be narrowed as compared to the rest of the bezel to expose at least a portion of at least one of the vent hole(s).

In a particular aspect, the hardware encoder includes a field programmable gate array (FPGA). For example, the FPGA may be programmed to encode a media signal to generate a media stream based on a first encoding algorithm. The hardware encoder can receive a different (e.g., second) encoding algorithm via a network and a processor of the hardware encoder may reprogram the FPGA to use the second encoding algorithm instead of the first encoding algorithm.

An illustrative example of a hardware encoder 100 is shown in FIG. 1. In a particular example, the hardware encoder is configured to receive a media signal 101 via input interface(s), such as via a high definition multimedia interface (HDMI) 102 or a serial digital interface (SDI) 104. The media signal 101 may correspond to live media or previously recorded media (e.g., video on demand (VOD) and/or digital video recorder (DVR)) content.

The hardware encoder 100 includes a processor 106, a memory 108, a data storage device(s) 110, a media capture device 112, and a network interface(s) 114. In an illustrative aspect, the data storage device(s) 110 includes solid-state drive (SSD) devices, although it is to be understood that alternate forms of magnetic, optical, or other data storage may also be used. In an illustrative example, the network interface(s) 114 includes wired and/or wired interfaces, including but not limited to an Ethernet interface, a Wi-Fi interface, a Bluetooth interface, and/or other interfaces. The hardware encoder 100 may also include input device(s) 116, such as buttons, and output device(s) 118, such as light emitting diode (LED) status indicators and a liquid crystal display (LCD) screen. In alternate examples, different types of status indicators and/or display screens may be used.

The memory 108, such as a random access memory (RAM), and/or the data storage device(s) 110 may store instructions executable by the processor 106, which may be a single-core or multi-core processor. Although a single processor 106 is shown, in some embodiments the hardware encoder 100 may include multiple processors, such as a central processing unit (CPU), a graphical processing unit (GPU), and/or a digital signal processor (DSP)

In illustrative aspects, the executable instructions represent a media processing module 120 and an administrative module 122. In some examples, the media processing module 120 is configured to perform one or more operations described with reference to the media server of FIG. 12, such as encoding, decoding, transcoding, bitrate conversion, etc. In some examples, the administrative module 122 may configure properties of the hardware encoder 100, including but not limited to an Internet protocol (IP) address, operation of the media capture device 112, etc. In an illustrative aspect, the administrative module 122 supports remote configuration of the hardware encoder 100, such as in response to instructions received via the network interface(s) 114. For example, the hardware encoder 100 may be configured or reconfigured via hypertext transfer protocol (HTTP) commands, Web Socket commands, commands received Bluetooth, etc.

The media capture device 112 may be a hardware capture card or other device that is configured to receive, condition, and/or forward the media signal 101 to the processor 106 for further processing during execution of the media processing module 120. The media capture device 112 may support a variety of media signal formats, qualities, and frame rates. For example, the media capture device 112 may support standard definition (SD), high definition (HD), ultra high definition (UHD), 4K, high dynamic range (HDR), 23.98/24/29.97/30/50/59.94/60 Hz frequency/frame rate, 8-bit color, and 10-bit color signals.

As shown in FIG. 1, hardware encoder 100 may be configured for two-way communication with various other devices and systems via one or more networks, such as public networks, private networks, local area networks, the Internet, etc. In a particular aspect, the hardware encoder 100 is configured to output a media stream 150 to a publishing destination. Publishing destinations include, but are not limited to, media servers, playback devices, content delivery networks (CDNs), social networks, etc. Although shown as a single media stream 150, in some examples the hardware encoder 100 is capable of outputting multiple media streams based on multiple received media signals. This may include multiple versions of the same media stream, such as to support adaptive bitrate (ABR) streaming.

In the example where the hardware encoder 100 transmits the media stream 150 to a social network, the hardware encoder may communicate via a social application programming interface (API) 140. For example, use of the social API may enable the hardware encoder 100 to cause the media stream 150 to be inserted into a message, post, or newsfeed of a particular social networking account (which may correspond to a business entity or an individual). The hardware encoder 100 may also transmit the media stream 150 to a media server 142 that functions as a media ingestion point for a social network.

In particular aspects, the hardware encoder 100 may be managed and configured via various user interfaces (UIs) 160, which may be written in HTML, Javascript, Web Sockets, etc. For example, a first UI may be operable to send commands to the hardware encoder 100 that cause the hardware encoder to start or stop transmission of the media stream 150 to a publishing destination. As another example, a second UI may be operable to remotely administer the hardware encoder 100 (e.g., publishing destination authorization, encoding settings, media stream output settings, media signal input settings, etc.). As another example, a third UI may enable administration of the hardware encoder 100 while on a local network that also includes the hardware encoder 100. To illustrate, the third UI may be accessible to manage the hardware encoder 100 via Bluetooth or local area Wi-Fi. In embodiments where the hardware encoder 100 outputs the media stream 150 to a social network, a fourth GUI associated with the social network (e.g., generated by a web server of the social network) may be operable to configure the hardware encoder 100.

In some embodiments, communication between various components of the system shown in FIG. 1 is facilitated by a message broker 144. For example, the message broker 144 may facilitate communication between components using message queue telemetry transport (MQTT), a client-server publish/subscribe protocol also referred to International Organization for Standardization (ISO)/International Electrotechnical Commission (IEC) 20922. As an illustrative example of operation, the message broker 144 may receive a message that identifies the hardware encoder 100 as its destination and may forward that message to the hardware encoder 100.

In a particular aspect, the message broker 144 (also referred to herein as a broker) corresponds to a server that other components of the system of FIG. 1 communicate to or through. The message broker 144 may advantageously "abstract" (e.g., hide) certain details regarding the hardware encoder 100, online services or configuration UIs, etc. To illustrate, the message broker 144 may enable communication with the hardware encoder 100 without knowledge of a universally unique identifier (UUID) of the hardware encoder 100. Instead, the message broker 144 may receive configuration information based on a different ID of the hardware encoder 100 (or a user/user account associated therewith) and may map (e.g., based on stored pairing information) that ID to the UUID of the hardware encoder 100 to forward the configuration information to the hardware encoder 100.

Figure 2:
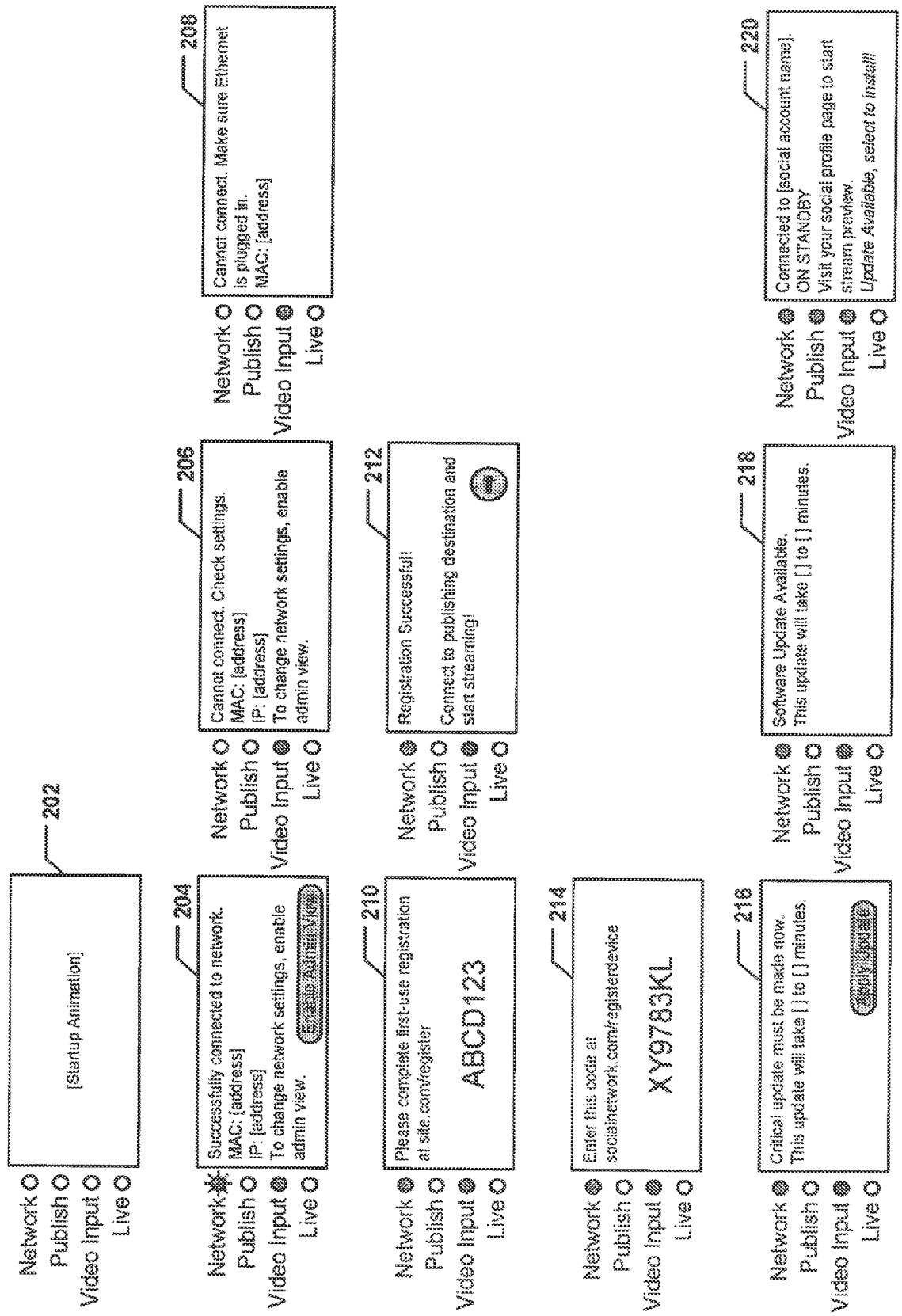
FIG. 2 is a diagram including examples of output at an output device of the hardware encoder of FIG. 1.

During operation, the hardware encoder 100 may publish various media streams, such as the media stream 150, to various destinations. Referring now to FIG. 2, the output device(s) 118 of the hardware encoder 100, such as a LCD touchscreen, display various messages and may receive input from a user. When the hardware encoder 100 is powered on, the LCD touchscreen may show a startup animation, at 202.

After powering on, the hardware encoder 100 may attempt to establish a network connection, such as with an authorization server, profile server, etc. of a vendor associated with the hardware encoder 100. If a network connection can be established, for example based on previously stored settings, then the LCD touchscreen may show that the hardware encoder is successfully connected to the network, at 204. During the connection attempt, the Network LED status indicator may periodically flash until the connection attempt times out or until the connection is completed, at which point the Network LED status indictor light may remain lit without flashing. If a video signal (e.g., the media signal 101) is being received, the Video Input LED status indicator may also be lit, as shown.

Conversely, if the network connection cannot be established, the LCD touchscreen may notify the user than an error has occurred. For example, in the case of partial success where an IP address is allocated to the hardware encoder 100 but the hardware encoder 100 cannot reach a vendor server, the LCD touchscreen may display the message shown at 206. As another example, if even an IP address was not allocated to the hardware encoder, the LCD touchscreen may display the message shown at 208. When a network connection cannot be established, the Network LED status indicator may be off, as shown.

After a network connection is established, the hardware encoder 100 may confirm that the hardware encoder is registered with a vendor and/or a publishing destination. For example, if the hardware encoder 100 is not registered with its vendor, the LCD touchscreen may display a first one-time use code, as shown at 210. A user may enter the first one-time use code on a website (e.g., site.com/register) to register the hardware encoder 100 with the vendor, which may result in a registration success display on the LCD touchscreen, as shown at 212.

As another example, if the hardware encoder 100 is not registered with a selected publishing destination, such as a particular social network, the LCD touchscreen may display a second one-time use code, as shown at 214. A user may enter the second one-time use code on a website (e.g., socialnetwork.com/registerdevice) to establish an output streaming connection from the hardware encoder 100 to the social network. When the connection to a publishing destination is established, the Publish LED status indicator may be lit. It is to be understood that in some cases the publishing destination may be operated by the vendor of the hardware encoder 100 (e.g., the Network and Publish LED status indicators may reflect connections to servers associated with the same entity). Moreover, it should be understood that although the term "vendor" is used herein, for the purposes of the described operations, the "vendor" of the hardware encoder 100 may correspond to a manufacturer, reseller, software provider (e.g., associated with the media processing module 120 or the administrative module 122). When a live media stream (e.g., the media stream 150) is being published, the Live LED status indicator may be lit.

A vendor or publishing destination may occasionally provide software updates to the hardware encoder 100. In the case of a critical update, the user may not be given the option to dismiss the update, and may instead be forced to install the update before further operations can proceed at the hardware encoder 100, as shown at 216. Conversely, for non-critical vendor or publishing destination updates, the user may not be forced to install the update right away, as shown at 218 and 220.

The hardware encoder 100 of FIGS. 1-2 may thus enable on-premise encoding and output of a media stream to various publishing destinations, including but not limited to social networks. Although not illustrated in FIGS. 1-2, it is to be understood that the hardware encoder 100 may support various other functions.

In a particular aspect, the hardware encoder 100 be configured to simultaneously pair with multiple publishing destinations, such as multiple social networks. To illustrate, the hardware encoder 100 may be used to simultaneously publish a live video stream to multiple social networks, CDNs, etc.

In a particular aspect, the hardware encoder 100 may be used in a pair with another hardware encoder 100 for failover. The hardware encoder 100 may support various video formats and streaming protocols. For example, the hardware encoder 100 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The hardware encoder 100 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3. The hardware encoder 100 may support communication (e.g., adaptive streaming and non-adaptive streaming) protocols including, but not limited to, HTTP Live Streaming (HLS), HTTP Dynamic Streaming (HDS) smooth streaming, and DASH (also known as MPEG-DASH or ISO/IEC 23009-1). The hardware encoder 100 may also support real time messaging protocol (RTMP) (and variants thereof, such as RTMP secure (RTMPS)), real-time streaming protocol (RTSP), real-time transport protocol (RTP), and MPEG-2 transport stream (MPEG-TS). Additional audio formats, video formats, coder/decoders (CODECs), and/or protocols may also be supported.

In a particular aspect, the hardware encoder 100 supports logging functionality. For example, the hardware encoder 100 may periodically generate log information indicating a "health" of the media stream 150. Log information may be categorized as informational, warning, error, or debug. The log information may be timestamped.

In a particular aspect, the hardware encoder 100 is fully configurable remotely. For example, all encoding settings, such as bitrates, CODECs, framerates, number of streams, etc. for use during encoding may be provided to the hardware encoder 100 by a remote device and/or via API access. To illustrate, a user may log in to a social network account and may input encoding settings, which may be delivered to the hardware encoder 100 directly or via a vendor server. As another example, a user may log in to a vendor server/account and may input encoder settings, which may be delivered to the hardware encoder 100 directly or via an API supported by the social network. Dynamic reconfiguration information may similarly be provided to the hardware encoder 100 during operation of the hardware encoder 100.

In a particular aspect, the hardware encoder 100 may support a "monitor output." For example, even if the media stream 150 is not being actively published to a publishing destination for subsequent delivery to viewer devise, the hardware encoder 100 may nonetheless provide a version of the media stream and/or stats regarding the media stream to an external device as part of the monitor output. In various embodiments, the monitor output may include a video preview, social network comments, social network reactions, a live/off-air indicator, a running live stream duration, an indication of audio volume associated with the media stream, a pairing code (e.g., if the hardware encoder 100 has not paired with a social network account), and a countdown to the media stream 150 going live if the hardware encoder 100 is operating on a schedule.

In a particular aspect, some or all of the information shown on the LCD touchscreen of the hardware encoder is also visible via a parallel web UI. For example, the LCD touchscreen and parallel web UI may show a MAC address of the hardware encoder 100, an IP address of the hardware encoder 100 (e.g., IPv4 or IPv6 address), streaming status information (e.g., off-air, live, countdown, error codes, etc.), a pairing code, stream information (e.g., frame size, framerate, health information, etc.), and/or other information.

In a particular aspect, the LCD touchscreen may be configured to receive particular inputs, such as input regarding IP address (which may include network mask and gateway information), video input (e.g., HDMI/SDI), audio volume, audio (e.g., XLR, RCA, or embedded audio inputs), monitor output resolution and refresh rate (e.g., 1080p60, 1080p50, 720p60, 720p50, etc.), etc.

In a particular aspect, the hardware encoder supports closed captions. For example, the hardware encoder 100 may receive closed captions as part of the media signal 101 and/or may generate closed captions that are added to the media stream 150. In an illustrative embodiment, closed captions are supported in formats including but not limited to CEA-608 (also known as "line 21") and CEA-708.

In a particular aspect, the hardware encoder 100 supports multiple input and output resolutions, including but not limited to 720p, 1080p and 4K. In a particular aspect, the hardware encoder 100 supports remote configuration/reconfiguration using a secure network connection. For example, remote configuration/reconfiguration information may be provided to the hardware encoder 100 via HTTP secure (HTTPS) and/or transport layer security (TLS) protocols. In some examples, remote configuration/reconfiguration information, even if received via HTTP/TLS, may be funneled through MQTT.

In a particular aspect, the hardware encoder 100 presents and receives acceptance of an end user license agreement (EULA), such as via the touchscreen LCD or remotely via an Internet-accessible UI. In a particular aspect, the hardware encoder 100 includes a trusted platform module (TPM) chip that stores encryption keys for authentication and also includes a cryptographic processor for key/hash generation and verification.

The administrative module 122 may be configured to support various administrative actions, which may be initiated locally (e.g., via the LCD touchscreen) or remotely. As used herein, configuration information (e.g., illustrative configuration information 152) provided to the hardware encoder may correspond to such administrative actions as well as other items, such as encoding parameters (e.g., number of media streams, bitrates, framerates, CODECs, overlays, closed captioning, etc.).

In a particular aspect, administrative actions include rebooting/restarting the hardware encoder 100, getting a device ID (e.g., universally unique identifier (UUID)), get/set network settings (e.g., MAC address, DHCP or manual configuration, IPv4/IPv6, IP address, gateway, etc.), getting software version information, getting vendor registration information, getting vendor/publishing destination pairing information or codes, unpairing from a particular publishing destination, checking for software updates, enabling/disabling local or remote administration, getting/setting capture settings (e.g., auto, HDMI, SDI), getting/setting audio volume level, getting countdown states, stopping a live broadcast, getting encoder status, getting stream health information, getting/setting stream quality, getting viewer information, getting social network share information, getting social network reaction information, getting social network comment information, etc.

Referring to FIG. 3, a particular example of messaging between devices in the system of FIG. 1 is shown. Messages in the system of FIG. 1 may comply with a particular message format. In some examples, the messages are Javascript Object Notation (JSON) messages. The JSON messages may also include a non-JSON header to simplify message routing over different transports (e.g., MQTT, Web Sockets, and representational state transfer (REST)). To illustrate, by examining the non-JSON header, a device may quickly determine whether the message is of interest or not.

In a particular aspect, a message may include two parts: a header and a body. In some examples, the header includes a comma delimited list of data and the body includes a fully formatted JSON message. In an illustrative aspect, the message may have the format shown at 310.

The header portion of the message may be versioned with a monotonically increasing version number that indicates the fields (and order of fields) present in the header portion. Empty fields in the header portion may interpreted as default values. In a particular example, the header fields may include one or more of a headerVersion, a messageType, a destination, a source, a messageID, or a subject.

As explained above, the headerVersion may be increasing version number that determines the definition of the header fields. The messsageType may be a text enumeration which may have values such as commandRequest, commandResponse, status, etc. The destination may be an identifier or address of a destination device, if a single destination is intended. For example, the destination may be encoder, admin, client, broker, etc. If the destination is blank, no destination is specified (in some cases, such as message may be interpreted as being intended for multiple destinations. The source may be an identifier or address of a source device, such as encoder, admin, client, broker, etc. In some examples, the source may be blank if unspecified or not needed. In a particular aspect, the source and destination identifiers may be members of a global namespace.

The messageId may be a unique per-message identifier. In some examples, the message ID may be a UUID prefixed with a message source, such as "encoder-123e4567-e89b-12d4-a427-929977440000." The subject may include additional information that can be used to classify the message. For example, for command messages, the subject field may include the actual command being communicated via the message. As another example, the subject field for a command response may be a the messageID of the command message triggered the command response.

In a particular aspect, header field values may be restricted from including certain characters, to simply header parsing. For example, header field values may be restricted from including commas (,), open/close brackets ([and]), and open/close braces ({and}). In some examples, some or all header fields are duplicated in the body of a message.

FIG. 3 also includes examples of messages in accordance with the message format shown at 310. To illustrate, a first example 320 shows a command request and a corresponding command response. A second example 330 shows a status message.

Figure 4A:
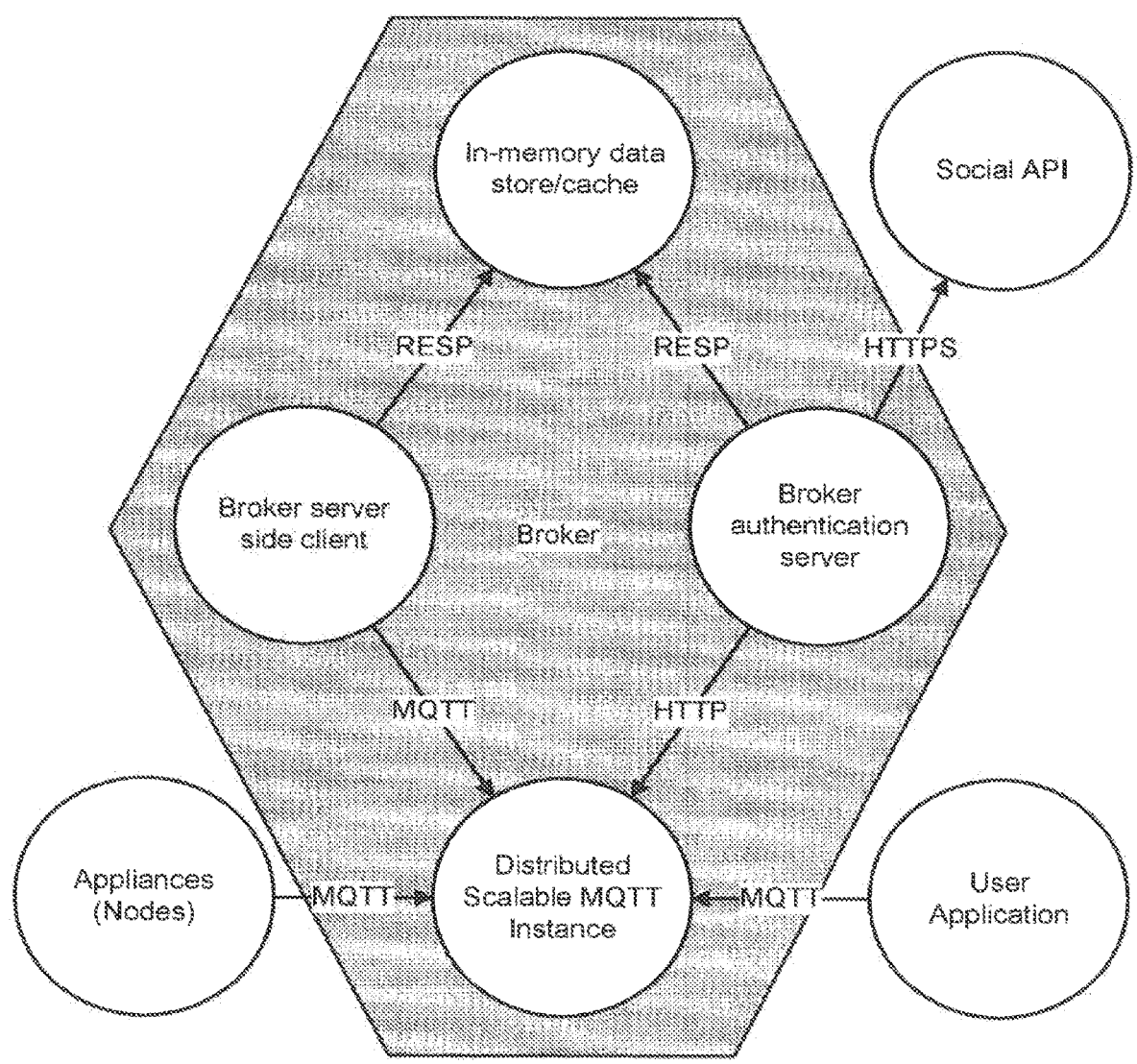
FIGS. 4A and 4B are diagrams of examples of messaging architecture that may be used in the system of FIG. 1.

FIG. 4A illustrates an example of a messaging architecture that may be used in the system of FIG. 1. For example, one or more components shown in FIG. 4A may function as part of the message broker 144 of FIG. 1.

In the example of FIG. 4A, a broker includes an in-memory data store/cache (e.g., Redis), a server-side client, an authentication server, and a distributed and scalable MQTT instance (e.g., EMQTTD). The broker may be configured to communicate with external appliances (e.g., nodes), user applications, and a social API (e.g., corresponding to a social network publishing destination). In an illustrative example, the social API shown in FIG. 4A is the social API 140 of FIG. 1.

The system of FIG. 4A (or components thereof) may perform message/queue server functions. For example, the distributed and scalable MQTT instance may authenticate clients based on a combination of the social API and data in the in-memory data store/cache.

A client side application, such as the user application shown in FIG. 4A, may connect with a client ID that is a combination of a hardware encoder ID and a random string. The client side application may also provide a social network username and a password based on an access token provided by the social network. The server side client shown in FIG. 4A may log in using an ID that is a combination of its own ID and a random number. The server side client may also provide a username/password that is stored in the in-memory data store/cache.

External appliances (e.g., nodes) shown in FIG. 4A may log in using an ID that is a combination of their own node ID and a random number. Alternatively, a random number may not be included. The external appliances may also provide a username/password that is stored in the in-memory data store/cache. Though not shown in FIG. 4A, it should be noted that the appliances may also connect to and communicate with the social API.

The distributed scalable MQTT instance may perform authorization functions in some embodiments. MQTT may support "topics," which are character strings that can be filtered to determine messages for each connected client. In a particular aspect, the distributed scalable MQTT instance may authorize clients to topics based on access control lists (ACLs) stored in the in-memory data store/cache. One exception to this may be allowing a client side application to publish to the topic "node/+/auth" and to publish and subscribe to the topic "user/username/#" (where "username" is the user's social network username) without having to add ACL data to the in-memory data store/cache.

In particular aspects, the system of FIG. 4A may support node-related topics, user-related topics, and/or cluster-related topics. User-related topics may include node/id/#, node/id/auth (clients publish to this topic to initiate an authorization request to a node and challenge responses; unauthorized users can only publish here), node/id/auth_add (nodes and authorized clients publish to this topic to notify the server side client to add a new ACL authorizing access to a node). The body of a message to the node/id/auth_add topic may be a JSON object and contain the username that is to be added ({"user":"myImportant"}). The server side client adds an ACL to giving the named user access to node/id/#, where the id is retrieved from the topic the message was received on.

User-related topics may include user/username/# and user/username/auth (a node publishes acknowledgment of an authentication request and requests a challenge response). Cluster-related topics may include cluster/#, cluster/new (a user or a node requests a new cluster ID), cluster/id/# (for cluster operations, which may be managed by the server side client with configuration data stored in the in-memory data store/cache).

Various UUIDs may be used in the system of FIG. 1. For example, a UUID [vendor.com-user-id] may uniquely identify a user account with the vendor. A UUID [motherboarder-serial] may uniquely identify the hardware of the hardware encoder 100. A UUID [Social-encoder-UUID] may uniquely identify the hardware encoder 100 to a social network, and may be a hash of the [motherboarder-serial] UUID. A UUID [engine-license-key] may be a license key for the media processing module 120. A UUID [vendor.com-pair-id] may be a pairing ID that pairs the-[vendor.com-user-id] and [motherboarder-serial] UUIDs, and broker communication may occur using the [vendor.com-pair-id] UUID. A [broker-username] UUID may be generated from the [motherboarder-serial] UUID, and the broker may map this to [motherboarder-serial] UUID. A [broker-password] UUID may correspond to how the hardware encoder 100 authenticates against the broker (e.g., this UUID may be generated by a manufacturer).

Figure 4B:
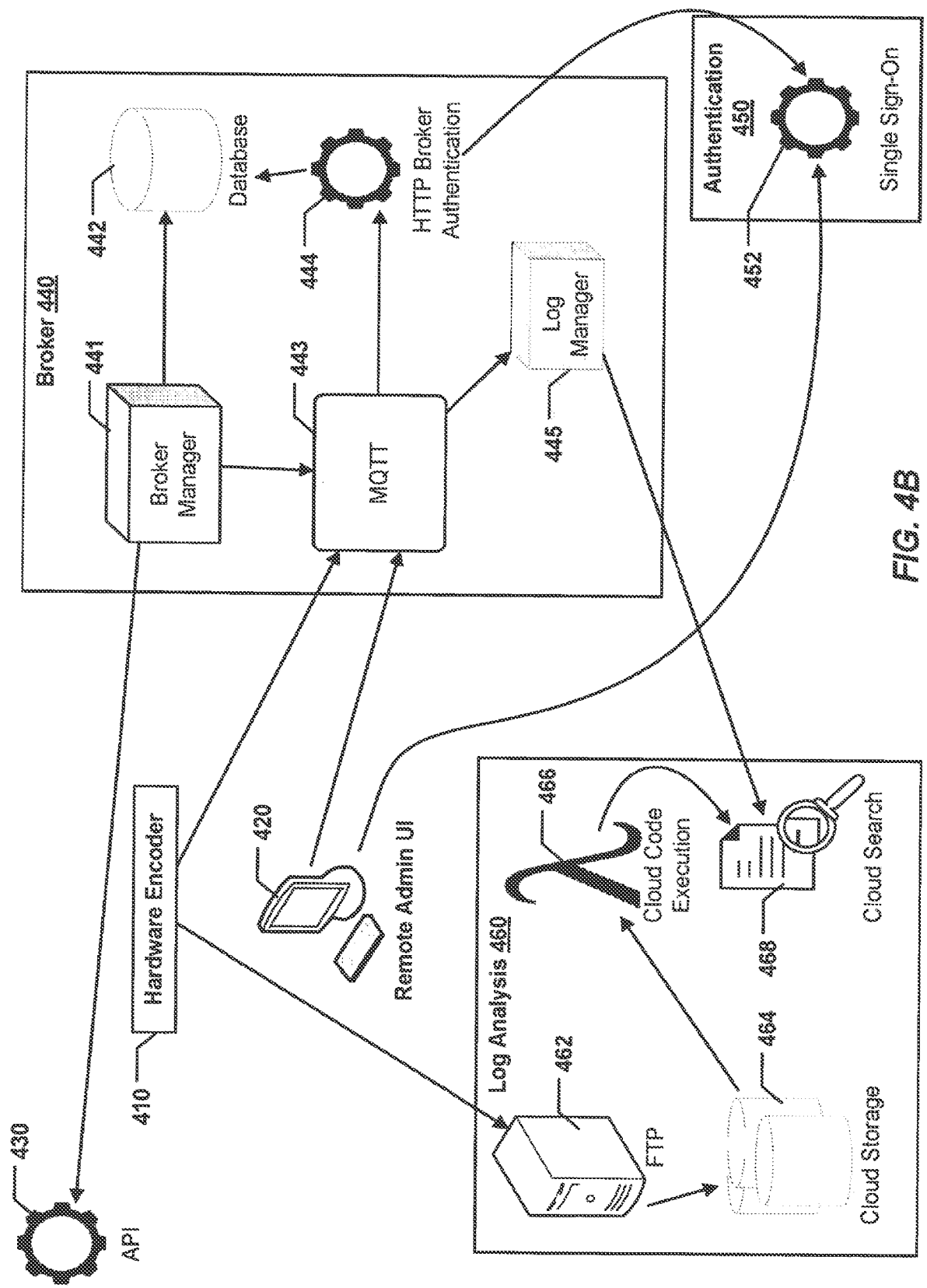

FIG. 4B illustrates additional details of a system architecture in conjunction with the present disclosure. The system includes a hardware encoder 410 (e.g., the hardware encoder 100 of FIG. 1), a remote administration user interface UI 420 for the hardware encoder, a broker group 440 (e.g., the broker of FIG. 4A), an authentication group 450, and a log analysis group 460. The system also includes an application programming interface (API) 430 that provides access to select functions of the broker group 440. The broker group 440 includes a broker manager 441, a database 442, a message transporter 443 compatible with the message queue telemetry transport (MQTT) protocol, a hypertext transfer protocol (HTTP) broker authentication service 444, and a log manager 445. The log analysis group 460 may include a file transfer protocol (FTP) server 462, cloud storage 464, cloud code execution 466 (e.g., automatically provisioned virtual machine(s) that execute lambda function code), and a cloud search domain 468 that supports searching logs generated by the hardware encoder 410. In the illustrated example, the authentication group 450 includes a single sign-on (SSO) service.

Various components of the system may communicate with each other, as shown by the arrows in FIG. 4B. However, it is to be understood the arrows, including directionality thereof, are for illustrative purposes only and are not to be considered limiting. In alternative examples, other components in the system may communicate with each other. It is further to be understood that communication in the system of FIG. 4B may be unidirectional or bidirectional.

As explained above, in some examples the hardware encoder 100 of FIG. 1 (or the hardware encoder 410) may pair with a vendor server instead of or in addition to pairing with a publishing destination (e.g., a social network). In a particular aspect, pairing interaction with the vendor server may include the following sequence of operations:

1. User logs in to a remote administration UI at a vendor server and receives [vendor.com-user-id]
2. Hardware encoder starts
3. Hardware encoder loads local pairing data to determine if it is paired (e.g., the hardware encoder is not dependent on a broker to determine if it is paired, and therefore pairing can be checked regardless of whether a broker is available)

4. Hardware encoder sends [motherboarder-serial] and a request for status
5. Broker sends [motherboarder-serial] and a pairing code
6. Hardware encoder shows pairing code on LCD touchscreen (e.g., at 210 of FIG. 2).
7. User accepts EULA
8. User requests to pair device
9. User enters pairing code from LCD touchscreen into remote administration UI
10. Administration UI provides the pairing code
11. If pairing is successful, Broker sends [vendor.com-user-id] to Admin [vendor.com-pair-id]
12. If pairing is successful, Broker sends [motherboarder-serial] to the hardware encoder [vendor.com-pair-id]
13. If pairing failed, Broker sends [vendor.com-user-id] failure status of pairing If pairing is successful, then the Admin has [vendor.com-pair-id] and [vendor.com-user-id], the hardware encoder has [vendor.com-pair-id], and the Broker has [vendor.com-pair-id], [vendor.com-user-id], and [motherboarder-serial].

In a particular aspect, pairing interaction with a social API may include the following sequence of operations:
1. Hardware encoder pairs with Social API
   a. User pairs with social network and receives an access token
   b. Register the hardware encoder using [Social-encoder-UUID] and receive a [Social-device-id]
   c. Hardware encoder persists the access token, [Social-device-id], [Social-encoder-id]
2. Pairing using a client UI (based on social login)
   a. User logs into social network and receives [Social-client-access-token] and [Social-user-id]
   b. User requests a list of [Social-device-id]s
   c. Query per [Social-device-id] and get back [Social-encoder-UUID] (e.g., a hashed derivative of [motherboarder-serial])
   d. Log in to broker with the [Social-client-access-token]
   e. Broker verifies that that user is paired with the encoder [Social-encoder-UUID]
   f. Broker sends the [vendor.com-pair-id]
   g. Client talks to the encoder over the [vendor.com-pair-id]

If pairing is successful, then the Broker has [vendor.com-pair-id], [vendor.com-user-id], and [motherboarder-serial], and the social network version of the client has [vendor.com-pair-id] and [Social-encoder-UUID].

In a particular aspect, a manufacturer of the hardware encoder 100 creates a random [broker-password] for each such hardware encoder, obtains an [engine-license-key] unique to each hardware encoder, and sends the vendor [motherboarder-serial], [broker-password], and [engine-license-key].

In a particular aspect, a manufacturer initially turns on each hardware encoder and triggers self-configuration via the broker. All UUIDs may be generated remotely by the broker, which may be restricted to a fixed IP address or username/password combination that is deleted from the accessing machine (in some cases, the entire configuration admin application may be deleted).

Thus, the disclosed systems and methods may alleviate various problems associated with encoding a media stream and communicating the media stream to a publishing destination. For example, traditional setup for a hardware encoder typically involves connecting the hardware encoder to a local network cable (e.g., an ethernet cable) and then configuring the hardware encoder from another machine on the local network using the hardware encoder's local network IP address. However, this requires the user to obtain the IP address of the local network and may need to be done using a command prompt if a configuration user interface is not supported. This process may be difficult for non-expert users and is also cumbersome. Instead, in accordance with the disclosed systems and methods, the hardware encoder 100 may contact a (e.g., preconfigured) broker and establish a bidirectional communication channel with the broker. The user does not have to address the hardware encoder 100 via the local network. Moreover, the broker, which may be a cloud-hosted service, can abstract multiple remotely located encoders in a single interface.

In some examples, the hardware encoder 100 performs adaptive bitrate operations. For example, the hardware encoder 100 may send a RTMP stream to a social network. The hardware encoder 100, the broker, or some other device/system may monitor the underlying TCP connection for the RTMP stream and may make bitrate adjustments based on the monitoring (e.g., in response to jitter, dropped packets, delay, etc.).

In a particular aspect, the hardware encoder 100 is manufactured using components that are selected as having low noise. The hardware encoder 100 may also be rack mountable. In some examples, the hardware encoder 100 is ruggedized.

Figure 5:
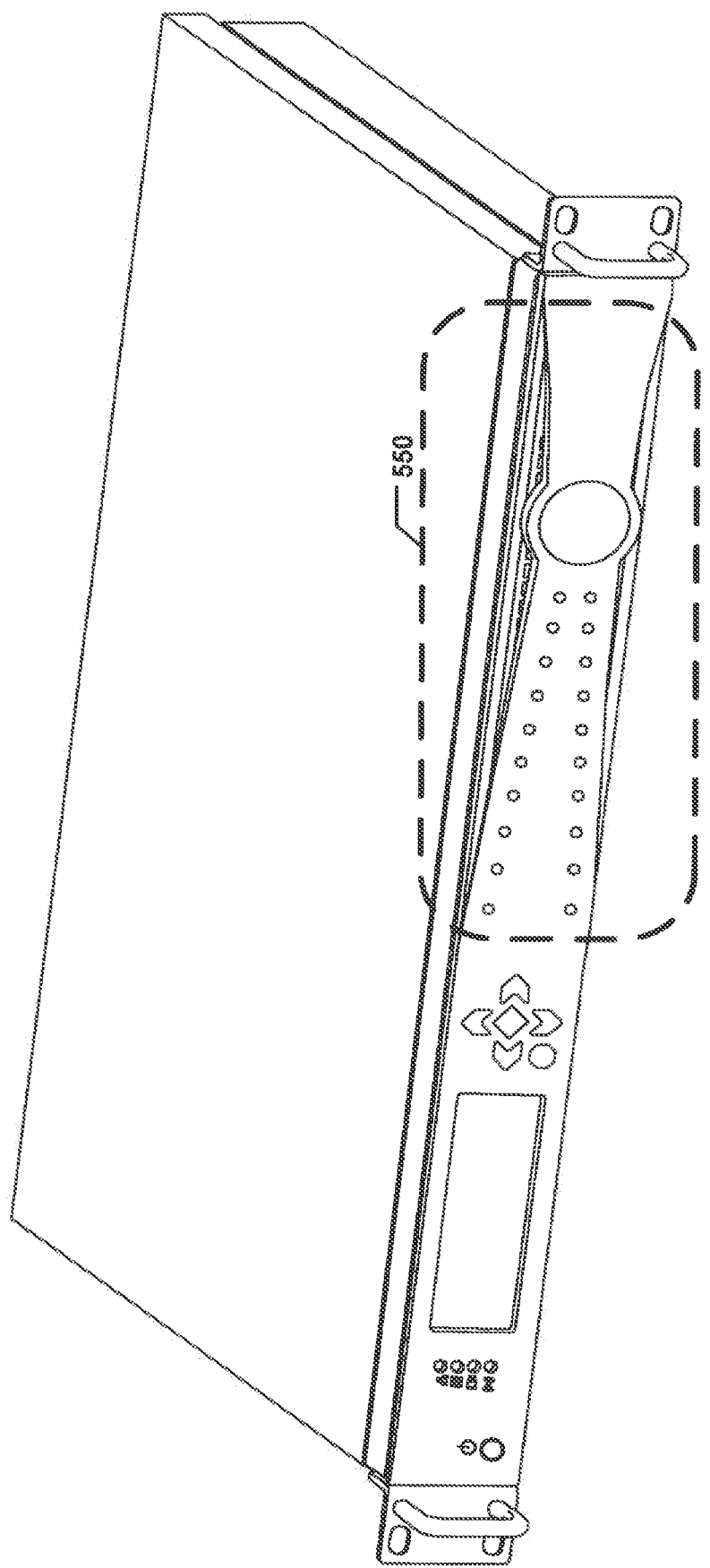
Figure 6:
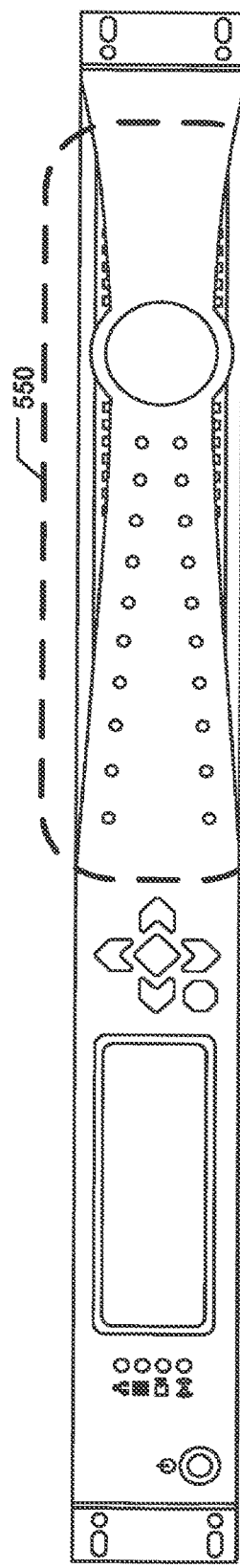
Figure 9:
Figure 10:
Figure 11:
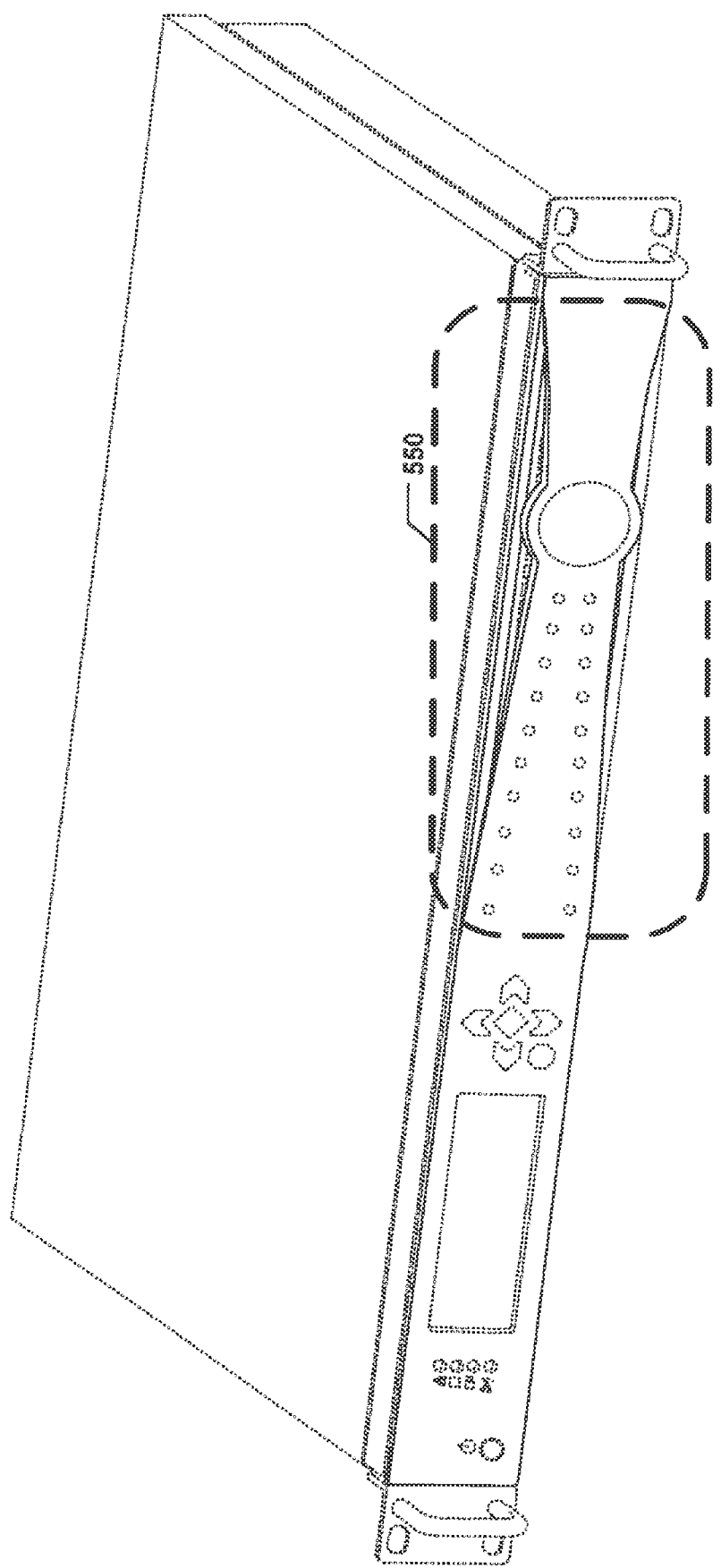
FIG. 11 is a perspective view of an alternative example of the hardware encoder of FIG. 1.

FIGS. 5-11 illustrate embodiments of the hardware encoder 100. As shown in FIGS. 5-11, the bezel of the hardware encoder 100 (which includes the LCD screen), may have unique ornamental design. FIG. 5 is a perspective view, FIG. 6 is a front view (the back view is unornamented), FIG. 7 is a top view, FIG. 8 is a bottom view, FIG. 9 is a left side view, and FIG. 10 is a right side view. A portion of the bezel on the right-hand side (designated 550) may be narrowed and may extrude forward from the rest of the bezel away from an outer chassis of the hardware encoder 100 (by e.g., up to three eighths of an inch). This may not only have a unique ornamental design, but may also enable improved airflow into vent holes of the outer chassis help cool components of the hardware encoder 100, comply with thermal/heat specifications/requirements, etc. Although FIGS. 5-11 illustrate embodiments of the bezel with the LCD screen on the left, it is to be understood that a mirrored version with the LCD screen on the right may also be used and as such as disclosed herein. The broken lines (e.g., in FIG. 11, which is a perspective view of an alternate embodiment) indicate that aspects other than the outer shape of the bezel may be optional/unclaimed. In an illustrative aspect, the bezel is cut from a single piece of metal and has holes to enable view/touching of an LCD touchscreen, various buttons, various LED status indicators, etc.

Figure 13:
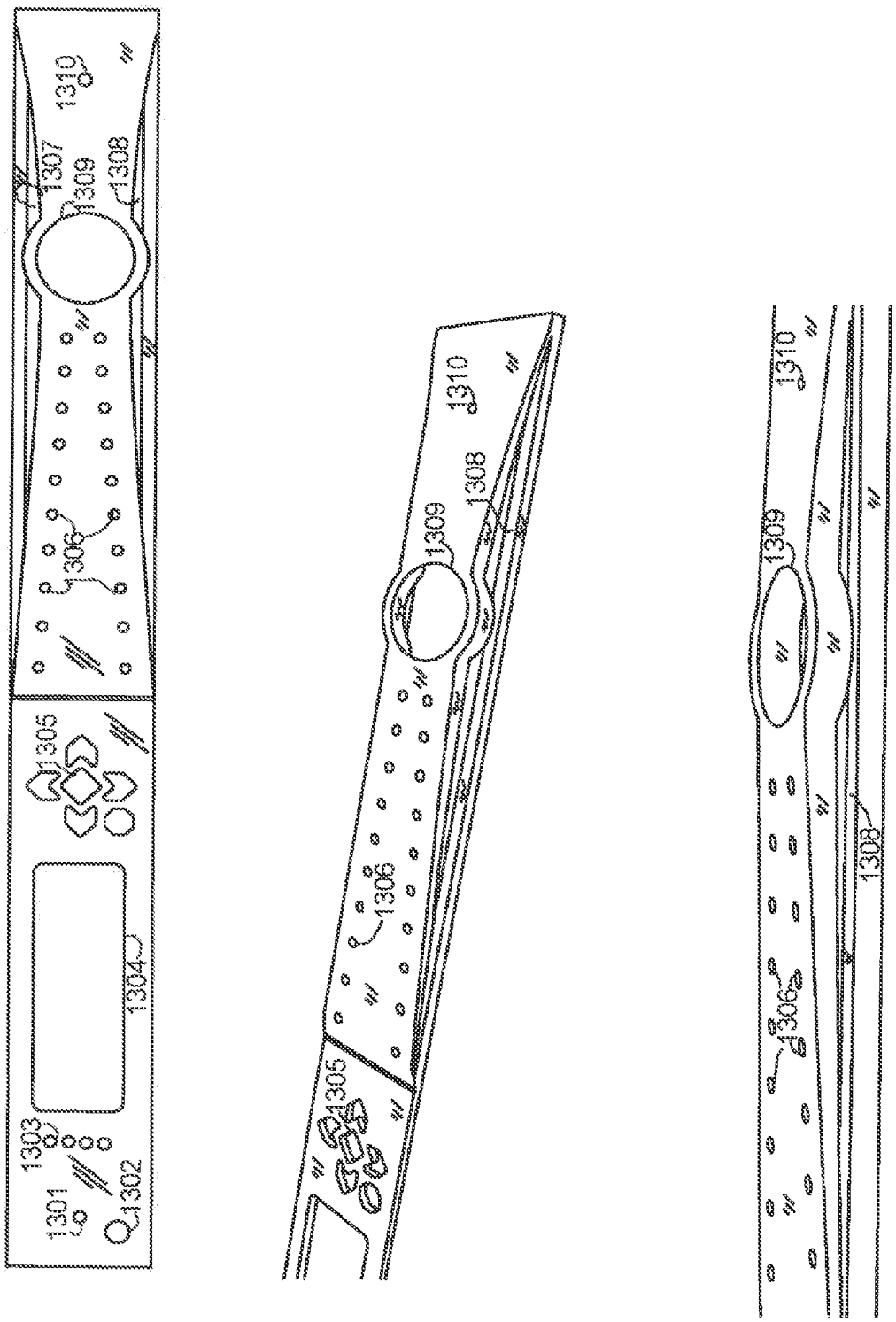
FIG. 13 is a diagram of an example of a bezel of the hardware encoder of FIG. 1.

In some embodiments, the bezel is cut out of a single piece of metal, as shown in the photos in FIG. 13, for example using laser cutting, silk screening, and/or other industrial processes. In the example of FIG. 13, the single piece of metal has the following openings: first screw hole 1301 (e.g., to attach to a chassis of the hardware encoder 100), power button hole 1302, status indicator light holes 1303 (e.g., to enable view of single-color or multi-colored LED lights), display screen hole 1304 (e.g., to enable view of and tactile access to an LCD touchscreen), control button holes 1305 (e.g., to enable tactile access to up/down/left/right/select/cancel buttons, which may supplement touchscreen input or may be used in lieu of touchscreen input if the display screen viewed via the hole 1304 does not support touch input), venting holes 1306 (e.g., to enable airflow into vents cut into the chassis), top and bottom extrusion openings 1307, 1308 (also enabling airflow into vents of the chassis), circular middle extrusion opening 1309 (in some examples, branding/logo materials may be placed in this opening, with an optional LED or other backlight source), and second screw hole 1310. It should be understood that in alternate embodiments the bezel may be made of different material(s) and may have more/fewer/differently sized/differently placed openings.

In an illustrative aspect, the hardware encoder 100 illustrated and described herein is 1U (i.e., less or equal to 1.75 inches in height, which corresponds to a unit of vertical rack space. It is to be understood however that in alternative aspects the hardware encoder 100 may have a larger or smaller form factor (e.g., baseball-sized, deck-of-cards-sized, etc.).

In a particular aspect, the hardware encoder 100 is remote configurable by multiple devices and entities. For example, an owner of the hardware encoder 100 may configure the hardware encoder 100 via an LCD touchscreen, via a mobile application (e.g., when the user's mobile device is on the same private network as the hardware encoder), via a remote configuration UI hosted by a vendor server or publishing destination server, etc. The LCD touchscreen of the hardware encoder 100 may thus provide control to software executing at the hardware encoder 100, such as the media processing module 120 or the administrative module 122. The vendor or publishing destination may also, in some examples, independently send configuration information to the hardware encoder. As an illustrative example, if the publishing destination wishes to have the hardware encoder 100 a new set of encoder settings, the publishing destination may push such settings to the hardware encoder (e.g., via the message broker 144) or may have the vendor issue a software update with such settings. The hardware encoder may thus be considered an on-premise extension of the publishing infrastructure associated with a publishing destination (e.g., a social network). It is to be understood, however, that the hardware encoder 100 may additionally or alternatively output streams to other types of publishing destinations, including but not limited to media hosting websites, standalone or cloud-based media servers/services, origin servers or edge servers, content delivery networks (CDNs), other output destinations/devices shown on the right side of FIG. 12, etc.

In a particular aspect, the various configuration information 152 described herein as being provided to the hardware encoder 100 may be dynamic in nature. To illustrate, a publishing destination or vendor may push the configuration information 152 to the hardware encoder 100, which may adjust encoding and generation of the media stream 150 on-the-fly without interrupting output of the media stream 150. As an illustrative example, if the publishing destination is experiencing a low or high amount of unused bandwidth, the publishing destination may push the configuration information 152 to cause the hardware encoder to decrease or increase the quality of the media stream 150, respectively. This operation may be distinguished from typical adaptive bitrate (ABR) streaming, because instead of a player device requesting a higher/lower quality stream in the face of changing network conditions, a publishing destination is instead adjusting encoding at the hardware encoder 100 based on conditions at the publishing destination.

In particular aspects, as explained above, the hardware encoder 100 may pair with one or more vendor servers and/or publishing destination servers and/or user accounts to receive control information that is input into various configuration UIs. The availability of such configuration UIs may, in some cases, enable all local configuration options to also be configured remotely. In some examples, different remote configurators may have access to different sets of configuration options (e.g., some configuration options may be accessible to a vendor server but not a publishing destination server, or vice versa; some configuration options may not be accessible to a user/owner of the hardware encoder 100 or may only be accessible to the user/owner of the hardware encoder 100, etc.).

In a particular aspect, the hardware encoder 100 is configured to receive "live" statistics 154 associated with the media stream 150, such as number of viewers, number of social network likes/dislikes, social network comments, etc. The hardware encoder 100 may display some or all of the statistics 154 on an output device 118, such as an LCD screen. To illustrate, the LCD screen may show number of viewers, number of likes, number of dislikes, and a most recently received comment. In some examples, the hardware encoder 100 may also dynamically reconfigure itself based on the statistics 154. As an illustrative non-limiting example, the hardware encoder 100 may shut off encoding and/or output of the media stream 150 if a particular number of dislikes or a particular ratio of likes to dislikes is detected. As another illustrative non-limiting example, the hardware encoder 100 may increase or decrease the quality of the media stream 150 based on the number of viewers, number of likes, and/or number of dislikes.

In some aspects, the hardware encoder 100 is configured to output the statistics 154, or at least a portion thereof to a different display device (e.g., via HDMI). In a particular embodiment, the hardware encoder 100 may send the statistics 154, or at least a portion thereof, to a source of the media signal 101 via a HDMI return channel. To illustrate the hardware encoder 100 may encode the statistics 154 to be compatible with transmission on a HDMI audio return channel (ARC).

In a particular aspect, the hardware encoder 100 includes a field programmable gate array (FPGA) device. For example, the FPGA device may be programmed to execute some of the operations described with reference to the media processing module 120, such as implementing a first video encoding algorithm. In some situations, it may be desired to use a different (second) video encoding algorithm instead. In these situations, the FPGA may be dynamically reprogrammed by a processor of the hardware encoder 100. Moreover, details regarding the second video encoding algorithm may be received as part of the configuration information 152, and may thus be pushed to the hardware encoder 100 by various parties, including but not limited to a publishing destination of the media stream. Reprogramming of a FPGA in the hardware encoder 100 may enable the hardware encoder 100 to be dynamically adjusted when industry encoding standards or protocol change, when player device capabilities change (e.g., 4K mobile devices become commonplace), etc.

In some examples, the hardware encoder 100 collects information about a source of the media signal 101. Moreover, the hardware encoder 100 may output such information to another device, such as part of the media stream 150 or via a separate communication channel. The hardware encoder 100 may also output such information locally (e.g., on an LCD screen).

It is to be understood that the hardware encoder 100 may be used in conjunction with various use cases involving a media stream. For example, the media stream 150 may be used in conjunction with a virtual reality (VR) or augmented reality (AR) use case. To illustrate, the hardware encoder 100 may adjust the media stream 150 and/or output the media stream 150 to a particular destination in the case of VR/AR. As another example, the hardware encoder 100 may perform facial recognition (the results of which may be included in a data channel of the media stream 150 or in a separate side channel) or may output the media stream 150 to a facial recognition device/server. As yet another example, the hardware encoder 100 may be configured to generate media fingerprints or include watermarks in the media stream 150 (e.g., for digital rights/copyright management). As another example, the hardware encoder 100 may output the media stream 150 to a surveillance system. Moreover, the hardware encoder 100 may be dynamically configured for each of the above use cases based on the available infrastructure/conditions at a publishing destination, a user account being used to provide the media stream, and/or information collected by the hardware encoder 100 regarding a source of the media signal 101.

Figure 12:
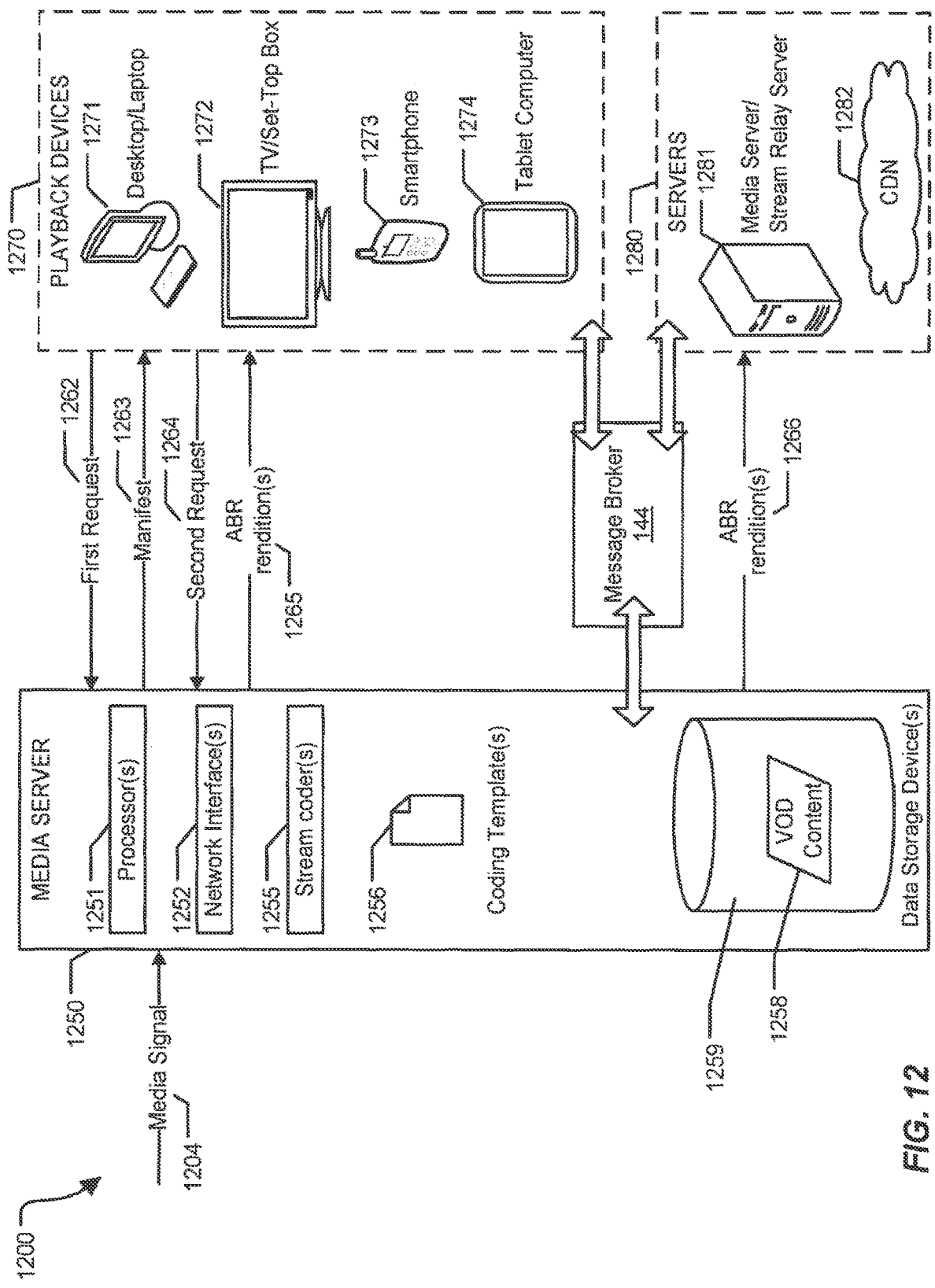
FIG. 12 is a diagram of a system including a media server.

FIG. 12 illustrates an embodiment of a system 1200 including a media server 1250. Certain operations described herein with reference to the media server 1250 may be performed by the hardware encoder 100 of FIG. 1. The media server 1250 may include one or more processor(s) 1251 and various components that are executable by the processor(s) 1251. The media server 1250 may include software application(s) that perform media serving or processing, hardware systems that support or perform media serving and processing, or any combination thereof. Thus, various operations described with reference to the media server 1250, or components thereof, may be implemented using hardware, software (e.g., instructions executable by the processor(s) 1251), or any combination thereof.

The media server 1250 may also include one or more network interface(s) 1252. For example, the network interface(s) 1252 may be configured to receive data and to send data via one or more networks. In a particular embodiment, the network interface(s) 1252 may be wired and/or wireless interfaces that enable the media server 1250 to communicate data via a network, such as the Internet. For example, the network interface(s) 1252 may include an Ethernet interface, a wireless interface compatible with an Institute of Electrical and Electronics Engineers (IEEE) 802.11 (e.g., Wi-Fi) protocol, a Bluetooth interface, or other wired or wireless interfaces.

Thus, the media server 1250 may be configured to receive and send data from various other devices (e.g., via a network, such as a local area network (LAN) or the Internet, via a wired or wireless network connection). For example, the media server 1250 may communicate with one or more of playback devices 1270 (e.g., devices configured to output a display of a stream of live content and/or a stream of a VOD content item) and one or more other servers 1280. In a particular embodiment, the media server 1250 may receive a media signal 1204. In an illustrative example, the media signal 1204 is received via one or more capture sources (e.g., a camera or a video encoder) or via one or more media content servers (e.g., a video on demand (VOD) database server or a server of a content delivery network (CDN)). Accordingly, the media signal 1204 may include a live or VOD/DVR content. In an illustrative example, the media signal 1204 corresponds to the media signal 101 of FIG. 1.

The media server 1250 may support multiple coding technologies and protocols. For example, the media server 1250 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 1250 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 1250 may support communication (e.g., adaptive streaming and non-adaptive streaming) protocols including, but not limited to, HLS, HDS, smooth streaming, and DASH (also known as MPEG-DASH or international organization for standardization (ISO)/international electrotechnical commission (IEC) 23009-1). The media server 1250 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 1250 may also include one or more stream coders 1255. The stream coder(s) 1255 may be configured to perform encoding, decoding, and or transcoding operations. In some examples, the stream coders 1255 generate multiple ABR rendition(s) 1265 from the media signal 1204. The ABR rendition(s) 1265 may be at least temporarily stored at one or more data storage device(s) 1259. In a particular embodiment, the data storage device(s) 1259 also store VOD content 1258 and/or DVR content. For example, the stream coder(s) 1255 may encode/decode/transcode the VOD content 1258 to generate multiple ABR renditions of the VOD content 1258, so that the media server 1250 may provide VOD streams to one or more of the playback devices 1270. In the example of FIG. 12, the playback devices 1270 include a desktop/laptop computer(s) 1271, a television(s)/set-top box(es) 1272, smartphone(s) 1273, and tablet computer(s) 1274.

The ABR rendition(s) 1265 of the media signal 1204 may correspond to different quality renditions of the media signal 1204. For example, the stream coder(s) 1255 may generate a high-quality ABR rendition of the media signal 1204 and/or may generate a lower-quality ABR rendition of the media signal 1204 that is suitable for streaming in low-bandwidth network conditions. The stream coder(s) 1255 may be configured to perform bitrate conversion, CODEC conversion, frame size conversion, etc. Moreover, such operations may be performed in response to requests from the playback devices 1270 or servers 1280. Thus, the media server 1250 may be able to generate multiple ABR rendition(s) 1265 of the media signal 1204 for different playback devices 1270 or servers 1280 experiencing different network conditions.

The one or more ABR rendition(s) 1265 may be sent to the one or more playback devices 1270 or servers 1280. In a particular embodiment, depending on a playback format supported by a requesting device, and/or coding parameters in use by the stream coder(s) 1255, the media server 1250 may send one or more ABR renditions to the requesting device based on requests received from the device. In a particular embodiment, parameters used by the stream coder(s) 1255 are stored in one or more coding template(s) 1256 (which may correspond to and/or be updated based on static or dynamic configuration information, such as the configuration information 152 of FIG. 1). For example, the coding template(s) 1256 may be computer-readable files (e.g., XML files) that define coding parameters (e.g., bitrate, type of CODEC, etc.) for various stream renditions.

During operation, the media server 1250 may perform coding of the media signal 1204 (and/or the VOD content 1258) for adaptive streaming. As described above, adaptive streaming is a media transmission mechanism that enables a receiving device to dynamically request different versions of a stream in response to changing network conditions. For example, a device may initiate an adaptive streaming session with the media server 1250 for the media signal 1204 (and/or a particular VOD content 1258 item) by sending a first request 1262. The media server 1250 may send a manifest 1263 to the device in response to the first request 1262. The manifest 1263 may include information describing each of the plurality of ABR rendition(s) 1265 (if any) of the media signal 1204 and/or the VOD content 1258 items. For example, the coding template(s) 1256 may define particular available ABR rendition(s) 1265 of the media signal 1204 and the manifest 1263 may be automatically generated based on the coding template(s) 1256.

Upon receiving the manifest 1263, the device may determine which (if any) of the available ABR rendition(s) 1265 of the media signal 1204 should be requested from the media server 1250. For example, the device may make such a determination based on buffering/processing capability at the device, network conditions being experienced by the device, etc. Upon determining which ABR rendition should be requested, the device may transmit a second request 1264 to the media server 1250. The second request 1264 may specify a particular ABR rendition of the media signal 1204. If there are no problems with receipt and playback of the requested ABR rendition of the media signal 1204, the device may continue to receive the requested ABR rendition of the media signal 1204 for continued playback. However, if conditions (e.g., playback and/or network conditions) become worse, the device may switch to a lower bitrate rendition by requesting a lower bitrate ABR rendition of the media signal 1204. Conversely, if conditions improve, the device may switch to a higher bitrate rendition. The stream coder(s) 1255 may generate key frame aligned portions for the adaptive streaming renditions, so that switching to a lower bitrate or higher bitrate ABR rendition appears "seamless" (e.g., does not result in noticeable visual glitches or dropped frames.

Thus, during an adaptive streaming session, the media server 1250 may receive the second request 1264 for a particular ABR rendition of the media signal 1204. Upon receiving the second request 1264, the media server 1250 may check whether the requested ABR rendition of the media signal 1204 is stored in the one or more data storage device(s) 1259. If so, the media server 1250 may respond to the second request 1264 by retrieving the requested ABR rendition from the one or more data storage device(s) 1259 and transmitting the requested ABR rendition to the device. If the requested ABR rendition is part of a different ABR rendition, the stream coder(s) 1255 may generate the requested ABR rendition by encoding/transcoding the media signal 1204, and the generated ABR rendition(s) 1265 may be transmitted to the device in response to the second request 1264.

The described techniques may also be used to generate and transmit multiple ABR rendition(s) 1266 of the media signal 1204 from the media server 1250 to the other servers 1280, as shown. For example, the media server 1250 may transmit the ABR rendition(s) 1266 to another media server 1281, a stream relay server, to a server (e.g., an edge server or an origin) of a content delivery network (CDN) 1282, to a publishing destination associated with a social network, etc. In a particular embodiment, requested content at the CDN 1282 may be set up using a pull through caching mechanism. The CDN 1282 may include one or more edge HTTP caching servers. If a cache miss for requested content occurs at a caching server, the caching server may pull the requested content from the media server 1250, which acts as an origin server.

It is to be understood that in various examples, communication to/from the media server 1250 may be conducted via a message broker, such as the message broker 144 of FIG. 1, which may operate as described with reference to the broker of FIG. 4A and/or FIG. 4B.

It is to be understood that the order of steps or operations described with reference to FIGS. 1-12 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream and a "digital video recorder" (DVR) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A hardware encoder comprising:
a chassis including at least one vent cut into a front surface of the chassis;
an input interface disposed within the chassis and configured to receive a media signal;
encoding circuitry disposed within the chassis and configured to encode the media signal to generate a media stream;
a network interface disposed within the chassis and configured to send the media stream to a publishing destination; and
a bezel removably attached to the front surface of the chassis and enabling a view of a display screen, a front surface of the bezel having a wide portion and a narrow portion positioned laterally adjacent to one another only on the front surface of the bezel, the narrow portion of the bezel is narrower than the wide portion of the bezel, the narrow portion of the bezel extruding in a forward direction away from the wide portion of the bezel and the front surface of the chassis, the narrow portion of the bezel including venting holes formed on the front surface of the bezel, wherein a top extrusion opening and a bottom extrusion opening is positioned respectively at a top side surface of the narrow portion of the bezel and a bottom side surface of the narrow portion of the bezel, wherein the venting holes and the top extrusion opening and the bottom extrusion opening enable direct airflow from the venting holes and the top extrusion opening and the bottom extrusion opening into the at least one vent cut into the front surface of the chassis, and the wide portion of the bezel having holes to enable touching of the display screen, one or more buttons, and at least one light emitting diode status indicator,
wherein the narrow portion of the bezel extends up to three eighths of an inch in the forward direction away from the front surface of the chassis and the bezel is produced from a single piece of metal.

2. The hardware encoder of claim 1, further comprising one or more input devices configured to receive user input related to encoding of the media signal.

3. The hardware encoder of claim 1, further comprising one or more output devices configured to output status information associated with encoding of the media signal.

4. The hardware encoder of claim 1, wherein the encoding circuitry comprises a field programmable gate array (FPGA).

5. The hardware encoder of claim 4, wherein the FPGA is configured to encode the media signal to generate the media stream based on a first encoding algorithm.

6. The hardware encoder of claim 5, wherein the network interface is further configured to receive data corresponding to a second encoding algorithm.

7. The hardware encoder of claim 6, further comprising a processor configured to reprogram the FPGA to encode a second media signal to generate a second media stream based on the second encoding algorithm.

8. The hardware encoder of claim 6, wherein the data corresponding to the second encoding algorithm is received via a message using a message queue telemetry transport protocol.

9. The hardware encoder of claim 8, wherein the message is based on an identifier corresponding to the hardware encoder, or wherein the message is received from a message broker system.

10. The hardware encoder of claim 6, wherein the data corresponding to the second encoding algorithm is received from a mobile device connected to a private local network.

11. The hardware encoder of claim 10, wherein the private local network comprises a local area Wi-Fi network or a Bluetooth network.

12. The hardware encoder of claim 10, wherein the data corresponding to the second encoding algorithm is received from a mobile application associated with a social network.

13. The hardware encoder of claim 12, wherein the network interface is further configured to send the encoded media stream to a publishing destination associated with the social network.

14. The hardware encoder of claim 1, wherein the network interface is further configured to receive configuration information, and wherein the encoding circuitry is further configured, during the encoding of the media signal, to adjust the encoding based on the configuration information.

15. A method comprising:
receiving a media signal at an input interface of a hardware encoder, the input interface disposed within a chassis of the hardware encoder, the chassis including at least one vent cut into a front surface of the chassis;
encoding the media signal to generate a media stream at encoding circuitry of the hardware encoder, the encoding circuitry disposed within the chassis;
and wherein the hardware encoder comprises a bezel removably attached to the front surface of the chassis and enabling a view of a display screen, a front surface of the bezel having a wide portion and a narrow portion positioned laterally adjacent to one another only on the front surface of the bezel, the narrow portion of the bezel is narrower than the wide portion of the bezel, the narrow portion of the bezel extruding in a forward direction away from the wide portion of the bezel and the front surface of the chassis, the narrow portion of the bezel including venting holes formed on a front surface of the bezel, a top extrusion opening and a bottom extrusion opening positioned respectively at a top side surface of the bezel and a bottom side surface of the bezel, wherein the venting holes and the top extrusion opening and bottom extrusion opening enable direct airflow from the venting holes and the top extrusion opening and the bottom extrusion opening into the at least one vent cut into the front surface of the chassis, and the wide portion of the bezel having holes to enable touching of the display screen, one or more buttons, and at least one light emitting diode status indicator; and
sending the media stream to a publishing destination via a network interface, the network interface disposed within the chassis
wherein the narrow portion of the bezel extends up to three eighths of an inch in the forward direction away from the front surface of the chassis and the bezel is produced from a single piece of metal.

16. The method of claim 15, further comprising encoding the media signal to generate the media stream based on a first encoding algorithm.

17. The method of claim 16, further comprising receiving data corresponding to a second encoding algorithm.

18. The method of claim 17, further comprising reprograming the encoding circuitry to encode a second media signal to generate a second media stream based on the second encoding algorithm.

* * * * *